US010325591B1

(12) United States Patent
Pogue et al.

(10) Patent No.: US 10,325,591 B1
(45) Date of Patent: Jun. 18, 2019

(54) IDENTIFYING AND SUPPRESSING INTERFERING AUDIO CONTENT

(71) Applicant: Amazon Technologies, Inc., Seattle, WA (US)

(72) Inventors: Michael Alan Pogue, Sunnyvale, CA (US); Kurt Wesley Piersol, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 68 days.

(21) Appl. No.: 14/478,923

(22) Filed: Sep. 5, 2014

(51) Int. Cl.
G10L 15/20 (2006.01)
G10L 17/22 (2013.01)

(52) U.S. Cl.
CPC .............. G10L 15/20 (2013.01); G10L 17/22 (2013.01)

(58) Field of Classification Search
None
See application file for complete search history.

(56) References Cited

U.S. PATENT DOCUMENTS

| 6,587,824 | B1* | 7/2003 | Everhart | G10L 15/07 704/243 |
| 7,222,301 | B2 | 5/2007 | Makagon | G06Q 10/06 715/727 |
| 7,418,392 | B1* | 8/2008 | Mozer | G10L 15/26 315/307 |
| 7,720,683 | B1* | 5/2010 | Vermeulen | G10L 15/22 704/235 |
| 7,774,204 | B2 | 8/2010 | Mozer et al. | |
| 7,974,714 | B2* | 7/2011 | Hoffberg | G06K 9/00369 360/75 |
| 8,358,328 | B2* | 1/2013 | Friel | H04N 7/15 348/14.01 |
| 8,447,608 | B1* | 5/2013 | Chang | G10L 15/197 704/257 |
| 9,313,359 | B1* | 4/2016 | Stojancic | H04N 1/32 |
| 9,318,108 | B2* | 4/2016 | Gruber | G10L 15/1815 |
| 9,324,322 | B1* | 4/2016 | Torok | G10L 15/22 |
| 9,332,364 | B2* | 5/2016 | Goldstein | H04R 1/1016 |
| 9,338,493 | B2* | 5/2016 | Van Os | H04N 21/42203 |
| 9,373,320 | B1* | 6/2016 | Lyon | G10L 21/02 |
| 9,384,754 | B2* | 7/2016 | Des Jardins | G10L 21/0224 |

(Continued)

FOREIGN PATENT DOCUMENTS

WO  WO2011088053 A2  7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

Primary Examiner — Fariba Sirjani
(74) Attorney, Agent, or Firm — Lee & Hayes, P.C.

(57) ABSTRACT

A speech interface device may capture user speech for analysis by automatic speech recognition (ASR) and natural language understanding (NLU) components. However, an audio signal representing the user speech may also contain interfering sound generated by a media player that is playing audio content such as music. Before performing ASR and NLU, a system attempts to identify the content being played by the media player, such as by querying the media player or by analyzing the audio signal. The system then obtains the same content from an available source and subtracts the audio represented by the content from the audio signal.

19 Claims, 6 Drawing Sheets

(56) References Cited

U.S. PATENT DOCUMENTS

| | | | |
|---|---|---|---|
| 9,947,333 B1* | 4/2018 | David | G10L 25/51 |
| 2004/0114772 A1* | 6/2004 | Zlotnick | H04R 3/005 |
| | | | 381/92 |
| 2004/0116088 A1* | 6/2004 | Ellis | H04B 1/20 |
| | | | 455/132 |
| 2005/0060142 A1* | 3/2005 | Visser | G10L 21/0208 |
| | | | 704/201 |
| 2005/0071159 A1* | 3/2005 | Boman | G10L 21/0208 |
| | | | 704/233 |
| 2005/0080620 A1* | 4/2005 | Rao | G10L 21/0208 |
| | | | 704/226 |
| 2005/0149296 A1* | 7/2005 | Sieracki | G06K 9/00523 |
| | | | 702/189 |
| 2007/0011040 A1* | 1/2007 | Wright | G06Q 30/02 |
| | | | 725/46 |
| 2007/0050832 A1* | 3/2007 | Wright | H04H 60/27 |
| | | | 725/115 |
| 2007/0124756 A1* | 5/2007 | Covell | G06F 17/30743 |
| | | | 725/18 |
| 2007/0186228 A1* | 8/2007 | Ramaswamy | H04H 60/37 |
| | | | 725/14 |
| 2007/0192782 A1* | 8/2007 | Ramaswamy | H04H 60/37 |
| | | | 725/9 |
| 2007/0266395 A1* | 11/2007 | Lee | H04H 60/31 |
| | | | 725/11 |
| 2007/0271300 A1* | 11/2007 | Ramaswamy | H04H 60/40 |
| 2007/0294085 A1* | 12/2007 | Gaos | H04L 12/66 |
| | | | 704/252 |
| 2008/0144864 A1* | 6/2008 | Huon | H04R 1/20 |
| | | | 381/305 |
| 2008/0147397 A1* | 6/2008 | Konig | G10L 15/22 |
| | | | 704/246 |
| 2008/0187163 A1* | 8/2008 | Goldstein | H04R 25/70 |
| | | | 381/380 |
| 2009/0055180 A1* | 2/2009 | Coon | B60R 16/0373 |
| | | | 704/251 |
| 2009/0147966 A1* | 6/2009 | McIntosh | H04R 3/005 |
| | | | 381/71.11 |
| 2009/0175462 A1* | 7/2009 | Varma | 381/71.1 |
| 2009/0216761 A1* | 8/2009 | Raichelgauz | H04H 20/103 |
| 2010/0102981 A1* | 4/2010 | Nielsen | H04H 60/31 |
| | | | 340/686.6 |
| 2010/0114527 A1* | 5/2010 | Lee | H04H 60/32 |
| | | | 702/181 |
| 2010/0142725 A1* | 6/2010 | Goldstein | G10L 19/00 |
| | | | 381/92 |
| 2010/0169908 A1* | 7/2010 | Nielsen | H04N 21/44222 |
| | | | 725/14 |
| 2010/0217590 A1* | 8/2010 | Nemer | G01S 3/8006 |
| | | | 704/233 |
| 2011/0078729 A1* | 3/2011 | LaJoie | G11B 27/28 |
| | | | 725/36 |
| 2011/0166856 A1* | 7/2011 | Lindahl | G10L 15/20 |
| | | | 704/233 |
| 2011/0182283 A1* | 7/2011 | Van Buren | H04M 3/4936 |
| | | | 370/352 |
| 2011/0320202 A1* | 12/2011 | Kaufman | G10L 17/04 |
| | | | 704/251 |
| 2012/0095958 A1* | 4/2012 | Pereira | G06F 17/3002 |
| | | | 707/609 |
| 2012/0102315 A1* | 4/2012 | Holtmanns | H04L 63/06 |
| | | | 713/150 |
| 2012/0223885 A1* | 9/2012 | Perez | G06F 3/011 |
| | | | 345/158 |
| 2013/0014141 A1* | 1/2013 | Bhatia | H04N 21/252 |
| | | | 725/10 |
| 2013/0058496 A1* | 3/2013 | Harris | G10L 21/0208 |
| | | | 381/94.1 |
| 2013/0332165 A1* | 12/2013 | Beckley | G10L 17/04 |
| | | | 704/246 |
| 2014/0020006 A1* | 1/2014 | Yamagishi | H04N 21/8173 |
| | | | 725/19 |
| 2014/0088742 A1* | 3/2014 | Srinivasan | G10L 25/54 |
| | | | 700/94 |
| 2014/0108441 A1* | 4/2014 | Samari | G06F 17/30551 |
| | | | 707/758 |
| 2014/0173661 A1* | 6/2014 | Yamagishi | H04N 21/431 |
| | | | 725/43 |
| 2014/0222436 A1* | 8/2014 | Binder | G06F 3/167 |
| | | | 704/275 |
| 2014/0254807 A1* | 9/2014 | Fonseca, Jr. | H04R 29/00 |
| | | | 381/56 |
| 2014/0254816 A1* | 9/2014 | Kim | G10K 11/16 |
| | | | 381/71.11 |
| 2015/0022636 A1* | 1/2015 | Savransky | H04R 3/00 |
| | | | 348/46 |
| 2015/0039637 A1* | 2/2015 | Neuhauser | G06Q 30/0201 |
| | | | 707/758 |
| 2015/0043758 A1* | 2/2015 | Yamada | G10K 11/178 |
| | | | 381/151 |
| 2015/0086033 A1* | 3/2015 | Tebbs | H04L 65/60 |
| | | | 381/77 |
| 2015/0127710 A1* | 5/2015 | Ady | H04W 4/206 |
| | | | 709/202 |
| 2015/0180989 A1* | 6/2015 | Seth | G06Q 30/0277 |
| | | | 709/224 |
| 2015/0289013 A1* | 10/2015 | Nelson | H04N 21/44213 |
| | | | 725/19 |
| 2016/0072599 A1* | 3/2016 | Kariyappa | H04H 60/58 |
| | | | 700/94 |
| 2016/0118059 A1* | 4/2016 | Hearing | G10L 25/51 |
| | | | 381/56 |
| 2016/0179831 A1* | 6/2016 | Gruber | G10L 15/26 |
| | | | 704/235 |
| 2017/0133033 A1* | 5/2017 | Des Jardins | G10L 21/0224 |
| 2017/0332165 A1* | 11/2017 | Goto | H04R 1/025 |

* cited by examiner

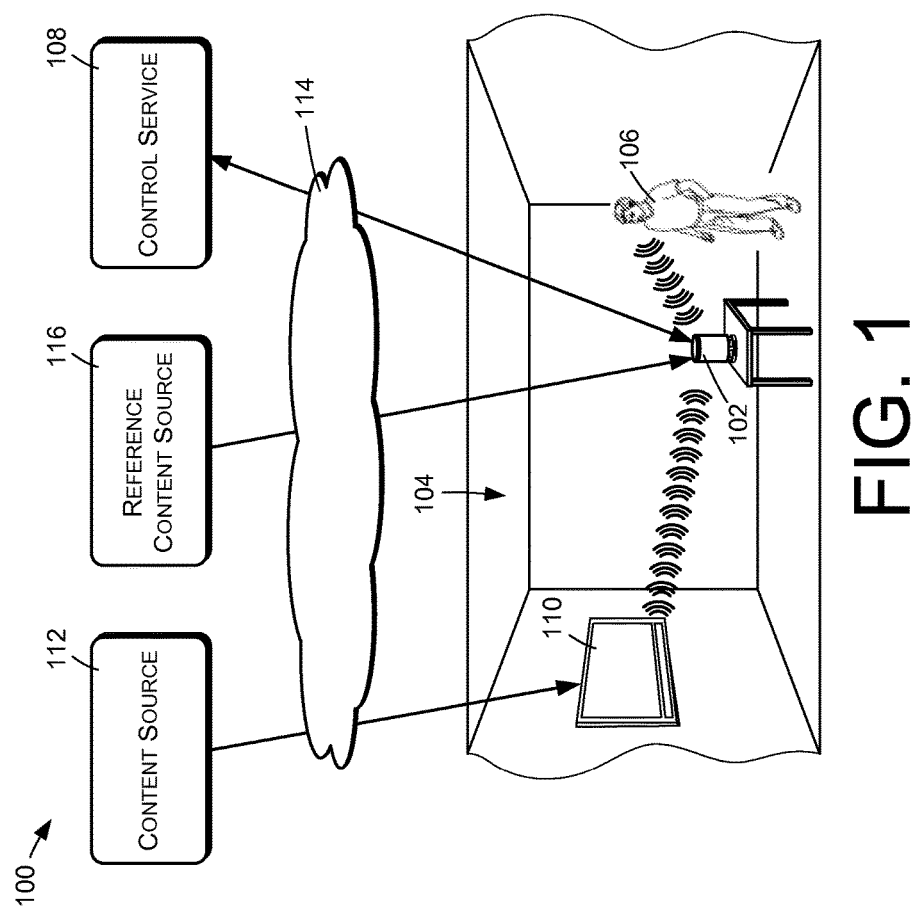

IDENTIFYING AND SUPPRESSING INTERFERING AUDIO CONTENT

BACKGROUND

Certain types of devices and services may interact with users through speech. A typical user environment, however, may contain sources of interfering sound that make it difficult to isolate user speech and to recognize and understand the user speech. In particular, a user environment may contain one or more media sources such as televisions, radios, or other audio devices that generate interfering sound.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 is a block diagram of an example speech interface platform that includes a speech-based device and a network-based control service.

DETAILED DESCRIPTION

Figure 3:
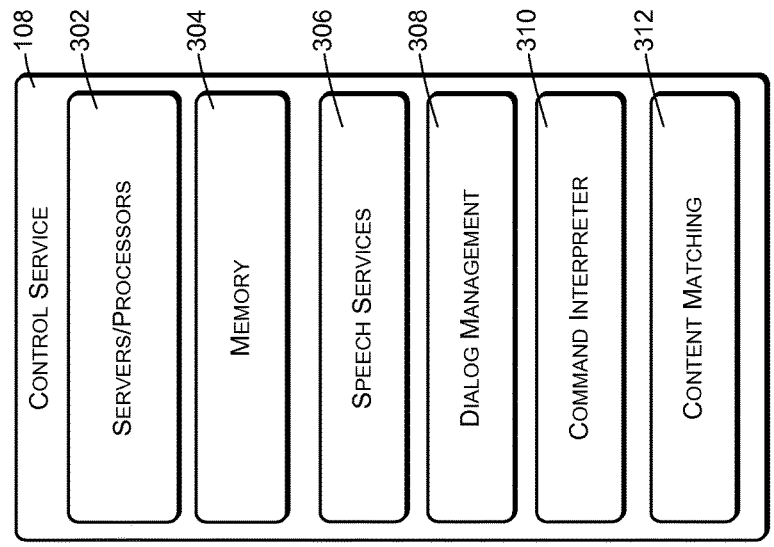
FIG. 3 is a block diagram illustrating relevant functional components of an example control service.

This disclosure pertains generally to a speech interface device and speech-based system configured to recognize and understand user speech in an environment where a separate and/or independent media player is producing interfering sound.

In an example implementation, the speech interface device has a microphone that produces an input audio signal containing user speech. The input audio signal may also contain interfering sound produced by an independent sound source such as a television, radio, music player, video player, tablet computer, smartphone, or other media player.

The speech-based system has access to one or more repositories or sources of audio content that may be playing on the media player. The sources may comprise online repositories, online streaming services, over-the-air (OTA) broadcasts, user libraries, etc. In certain embodiments, the sources may be relatively comprehensive, and may include a substantial portion of all content items that are available to large numbers of users.

The speech-based system uses one or more of several different techniques to identify the audio content that is currently being played by the media player. Upon identifying the interfering audio content, the speech-based system obtains the same content from an available source and uses the obtained content as a reference signal in an interference cancellation process that suppresses or removes the content from the input audio signal. Automatic speech recognition and natural language understanding can then be performed on the resulting interference-suppressed audio signal.

In certain situations, the audio content being played by the media player can be identified by communicating with and querying the media player or an associated online service. In some cases, for example, an online media service providing streaming audio to the media player can be queried to identify the audio content.

In other situations, the speech-based system may analyze the input audio signal to create a signature or fingerprint of a portion of currently playing audio content. The created signature or fingerprint may then be compared to signatures or fingerprints of known and available reference content items to identify which of the reference content items is currently playing. Reference content items can be obtained or accessed from multiple content services, repositories, and sources, including broadcast sources such as Internet streaming services and over-the-air or cable broadcast networks. Sources may also include personal media libraries of users, online or network-based public sources such as media sharing services, social media sites or streams, for-purchase media services, on-demand media services, subscription media services, etc.

When comparing the signature of currently playing audio content to signatures of reference content items, the set of considered reference items may be limited based on known information, such as information regarding media that the user owns, information regarding which content the user has access to, and known broadcast times of various content items. Limiting the set of considered reference items may reduce the complexity of searching for matching reference content.

FIG. 1 shows an example of a voice-based platform or system 100 such as may be used to implement these techniques. The system 100 may include or may utilize a speech interface device 102 that is capable of capturing and playing audio. The speech interface device 102 may be local to and/or located within an environment 104 such as a home or other premises to provide services for a user 106. The speech interface device 102 may be alternatively referred to herein as a speech interface, as an interface device, or simply as a device. In different embodiments, the functions of the speech interface device may be performed by different types of devices including mobile devices such as smartphones, tablet computers, media players, personal computers, etc.

The speech interface device 102 may operate in conjunction with and/or under the control of a remote, network-based or network-accessible control service 108, also referred to as a speech service or speech-based service, that is configured to receive audio from the speech interface device 102, to recognize speech in the received audio, and to perform or initiate functions or services in response to the recognized speech. Such functions or services may be implemented by the control service 108 independently of the speech interface device 102, and/or may be implemented by providing a command to the speech interface device 102 for local execution by the speech interface device 102. For example, the control service 108 may instruct the speech interface device 102 to play music, speech, or other audio content specified by the control service 108. Additionally, functions or services may be implemented by applications that are enabled and/or installed by the user for execution on the speech interface device 102 or the control service 108.

The environment 104 may include a media player 110, such as a television, radio, music player, video player, computer, smartphone, tablet computer, or other device that produces interfering sound. In some cases, the media player 110 may lack external connectivity and may play music or other content from local media such as CD-ROMs, DVDs, or other storage media. In other cases, the media player 110 may receive streamed audio content from one or more remote content sources 112.

The remote content source 112 may comprise one of various types of online or remote network-based services, including but not limited to:
- terrestrial broadcasts;
- cable broadcasts;
- satellite broadcasts;
- streaming media;
- downloadable media;
- subscription-based media;
- on-demand media;
- pay-per-access media;
- user-owned media;
- user-accessible media; or
- podcasts.

Various components of the system 100 may communicate through a network 114 which may comprise a public, wide-area network such as the Internet. For example, the speech interface device 102 may communicate with the control service 108 through the network 114 and the media player 110 may communicate with the content source 112 through the network 114 to receive audio content. Each of the control service 108 and the content source 112 may thus be located remotely from the environment 104 and may provide services for large numbers of speech interface devices 102 and media players 110.

The speech interface 102 may also have access to a reference content source 116 through the network 114. The reference content source 116 may contain audio content that matches the audio content of the content source 112, and in some cases the content source 112 and the reference content source 116 may comprise the same source or sources. The speech interface device 102 is configured to obtain reference content that matches the content currently being played by the media player 110 and to use the reference content in a process of suppressing the currently playing content from the input audio signal of the speech interface device 102. This process will be explained in more detail in the subsequent discussion.

In the described embodiments, a primary mode of user interaction with the system 100 is through speech. For example, the system 100 captures spoken commands from the user 106 and provides services in response to the commands. For example, the user may speak predefined commands (e.g., "Awake"; "Sleep"), or may use a more casual conversation style when interacting with the speech interface device 102 (e.g., "I'd like to go to a movie. Please tell me what's playing at the local cinema."). Provided services may include performing actions or activities, rendering media, obtaining and/or providing information, providing information via generated or synthesized speech via the speech interface device 102, initiating Internet-based services on behalf of the user 106, and so forth.

In operation, the speech interface device 102 captures audio and provides the audio to the control service 108. The audio may contain user speech. The control service 108 performs automatic speech recognition and natural language understanding on the captured audio in order to determine an intent expressed by the user speech. In response to the determined intent, the control service 108 determines and performs an appropriate action. The action may be performed in conjunction with the speech interface device 102, such as by instructing the speech interface device 102 to play speech or music. Alternatively, the control service 108 may perform an action apart from the speech interface device 102, such as placing online orders on behalf of the user 106, requesting services, and so forth. In some cases, the control service 108 may conduct a two-way speech dialog with the user 106 to solicit information and/or to provide requested information to the user 106.

In addition to capturing user speech, the speech interface device may also capture interfering sound produced when the media player 110 plays interfering audio content. As will be described in more detail below, the system 100 is configured to identify the interfering audio content and to suppress the corresponding sound in the microphone audio signal, thereby allowing more accurate and reliable speech recognition.

Figure 2:
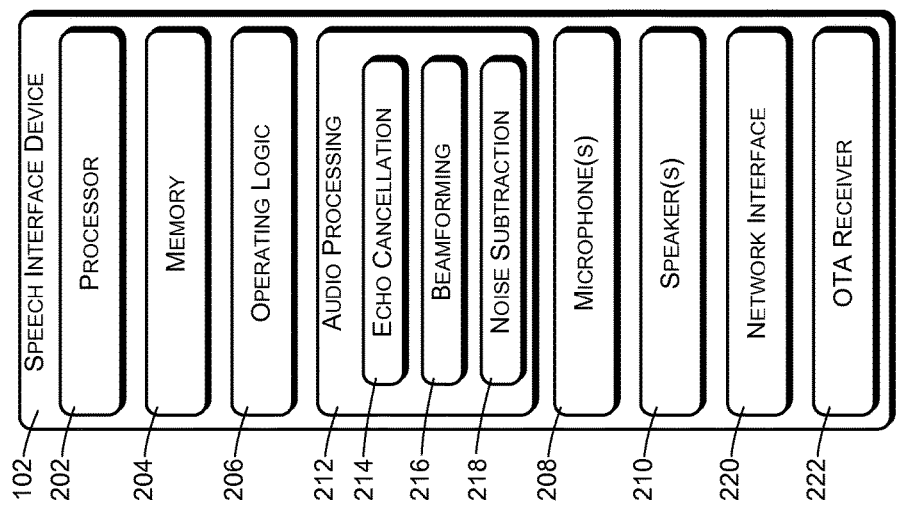
FIG. 2 is a block diagram illustrating relevant functional components of an example speech interface device.

FIG. 2 illustrates selected components of an example implementation of the speech interface device 102, including logical and physical components most relevant to the discussion herein. The speech interface device 102 may have other components that are not shown.

Logical functionality of the speech interface device 102 may be implemented by one or more processors 202, associated memory 204, and software that is stored in the memory 204 and executed by the processor 202. The software may comprise computer-executable instructions or programs. The one or more processors 202 may include a processor having multiple cores as well as digital signal processors, application-specific integrated circuits (ASICs) and/or other types of processing devices. The memory 204 may be a type of non-transitory computer storage media and may include volatile and nonvolatile memory. Thus, the memory 204 may include, but is not limited to, RAM, ROM, EEPROM, flash memory, magnetic memory media, optical memory media, or other memory technology. The memory 204 may also comprise media that is used for transferring data and software, such as CD-ROMs, DVDs, memory sticks, etc. The memory 204 may reside in or be provided by various components of the speech interface device 102. The memory 204 may in some cases may be external to the speech interface device and may accessed through network communications or other interfaces including wireless interfaces.

Software of the speech interface device 102 may include operating logic 206 that implements general functionality of the device 102 as described herein. The operating logic 206 may include an operating system, drivers for physical elements of the device 102, applications for performing specific functions or tasks, communication interfaces, etc.

The speech interface device 102 may have one or more input microphones 208 and one or more speakers 210 to facilitate audio interactions with the user 106. The input microphones 208 produce one or more audio signals representing ambient audio such as sounds uttered by the user 106 or other sounds within the environment 104. The audio signals produced by the microphones 208 may also contain delayed audio components from the speaker 210, which may be referred to herein as echoes, echo components, or echoed components. Echoed audio components may be due to acoustic coupling, and may include audio components resulting from direct, reflective, and conductive paths. On some embodiments, the one or more microphones 208 may comprise a microphone array suitable for use in audio beamforming or sound source localization (SSL).

The speech interface device 102 may have audio processing components 212, which may include functionality for processing input audio signals generated by the input microphone(s) 208 and/or output audio signals provided to the speaker 210. As an example, the audio processing components 212 may include an acoustic echo cancellation or suppression component 214 for reducing acoustic echo generated by acoustic coupling between the microphones 208 and the speakers 210.

In some embodiments, the audio processing components 212 may include one or more audio beamforming components 216 to generate an audio signal that is focused in a direction from which user speech has been detected. More specifically, the beamforming components 216 may be responsive to a plurality of spatially separated microphones or a microphone array to produce audio signals that emphasize sounds originating from different directions relative to the speech interface device 102, and to select and output one of the audio signals that is most likely to contain user speech.

The audio processing components 212 may also include an interference reduction or subtraction component 218 for reducing noise in received audio signals, such as elements of audio signals other than user speech. As will be described in more detail below, the interference reduction or subtraction component 218 may be configured to suppress certain types of interfering sound from the input audio signal produced by the microphone 208, such as interfering sound produced by the media player 110.

The speech interface device 102 may further include a network interface 220 for communicating over the network 114 with the control service 108 and the reference content source 116. The network interface 220 may comprise a wireless network interface such as a WiFi® interface, or may comprise any of various other types of interfaces. In many cases, the network interface 220 may be configured to communicate with a local wireless access point and/or router located within the environment 104, and which in turn is configured to provide communications over the public network 114.

The speech interface device 102 in some embodiments may comprise an over-the-air (OTA) receiver 222 or broadcast receiver for receiving terrestrial broadcasts, including radio and television broadcasts. In some cases, the OTA receiver 222 may be implemented as a software-defined radio or tuner. The OTA receiver 222 may be tunable to receive and demodulate different broadcasts, stations, channels or frequencies. The OTA receiver may in some cases have multiple demodulation channels for receiving and concurrently demodulating multiple broadcasts. A similar receiver or tuner may be configured to receive and/or decode other types of broadcasts, such as cable network broadcasts or other wire-based broadcasts.

FIG. 3 illustrates selected components of an example implementation of the control service 108, including logical and physical components most relevant to the discussion herein. The control service 108 may have other components that are not shown.

The control service 108 may in some instances be part of a network-accessible computing platform that is maintained and accessible via the network 114. Network-accessible computing platforms such as this may be referred to using terms such as "on-demand computing", "software as a service (SaaS)", "platform computing", "network-accessible platform", "cloud services", "data centers", and so forth. The control service 108 may be configured to provide services to large numbers of speech interface devices 102 in the homes or premises of different users.

The control service 108 is configured to receive an audio stream from the speech interface device 102, to recognize speech in the audio stream, and to determine user intent from the recognized speech. Depending on the nature of the recognized intent, the control service 108 may respond by performing an action or instruction the speech interface device 102 to perform an action.

The control service 108 includes operational or control logic, which may comprise one or more servers, computers, and/or processors 302. The control logic may also include memory 304 containing applications, programs, and/or other software in the form of instructions that are executed by the processor 302 to perform acts or actions that implement desired functionality of the control service 108, including the functionality described herein. The memory 304 may be a type of non-transitory computer-readable storage media and may include volatile and nonvolatile memory. Thus, the memory 304 may include, but is not limited to, RAM, ROM, EEPROM, flash memory, magnetic media, optical media, or other memory technology. The memory 304 may also include media commonly used for transferring or distributing software, such as CD-ROMs, DVDs, flash drives, memory sticks, etc.

Among other logical and physical components not specifically shown, software of the control service 108 may include a speech processing component 306, also referred to as speech services 306. The speech services 306 may include automatic speech recognition (ASR) functionality that recognizes human speech in an audio signal provided by the speech interface device 102 from the microphone 208. The speech services 306 may also include natural language understanding (NLU) functionality that determines user intent based on user speech that is recognized by the speech recognition components. The speech services 306 may also include speech generation functionality that synthesizes or otherwise produces speech audio. For example, the speech generation functionality may comprise a text-to-speech component that produces speech to be played on the speaker 210 of the speech interface device 102.

The control service 108 may also have a dialog management component 308 configured to coordinate speech dialogs or interactions with the user 106 in conjunction with the speech services 306. Speech dialogs may be used to determine or clarify user intents by asking the user for information using speech prompts.

The control service 108 may also comprise a command interpreter and action dispatcher 310 (referred to herein simply as a command interpreter 310) that determines functions or commands corresponding to intents expressed by user speech. In some cases, commands may correspond to functions that are to be performed at least in part by the speech interface device 102, and the command interpreter 310 may in those cases provide device commands or instructions to the speech interface device 102 for implementing such functions.

The control service 108 may also have a content matching component 312 that identifies and/or obtains audio content corresponding to interfering sound contained in the audio signal received from the speech interface device 102. The content matching component 312 may be configured to generate a signature or fingerprint of the interfering sound, to identify reference content having a closely matching signature, and to provide or direct the reference content to the speech interface device 102 so that the speech interface device 102 can cancel the interfering sound from the audio signal.

Figure 4:
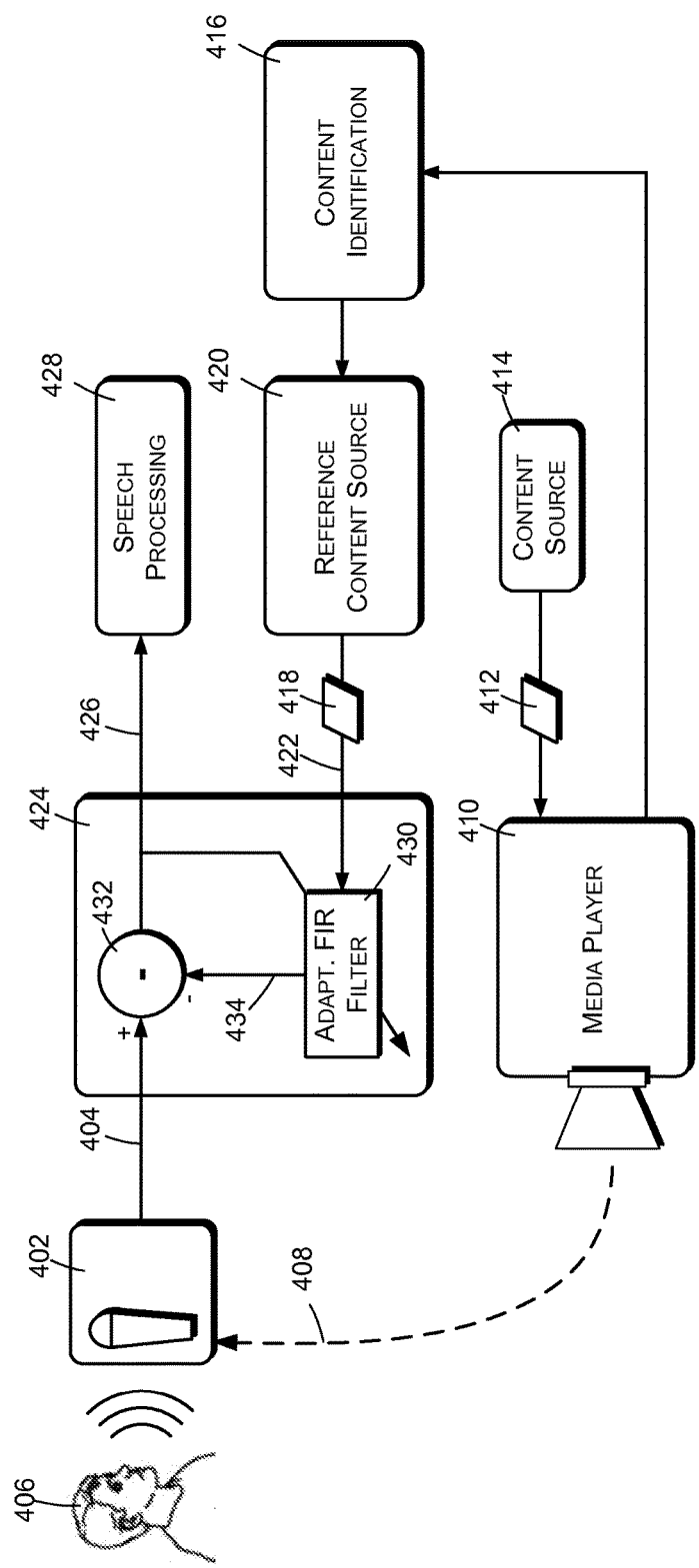
FIGS. 4 and 5 are block diagrams illustrating example implementations for suppressing interfering audio content from input audio signals.

FIG. 4 illustrates logical operations and functionality that may be implemented in the system 100 for reducing audio interference that is due to interfering sound that can be identified as corresponding to available audio content produced by the media player 110. In the context of the system 100, the described functionality may be performed at least in part by the interference subtraction component 218 of the speech interface device 102 and the content matching component 312 of the control service 108. However, the described functionality can also be performed by other combinations of devices, services, and entities. Furthermore, any of the operations or functions shown in FIG. 4 may be performed by either the speech interface device 102 or the control service 108.

A microphone, microphone array, and/or audio beamforming component 402, referred to as an audio input component 402 in the following discussion, produces an audio signal 404 that contains speech or utterances of a user 406. In some cases, the audio signal 404 may comprise a beam-focused or directional audio signal that emphasizes sound received from the direction of the user 406. The audio signal 404 also contains interfering sound 408 that has been played by a media player or system 410. The interfering sound 408 may correspond to player audio content 412 that is received or obtained from a player content source 414. In some cases, the media player or system 410 may comprise a self-contained device and the player content source 414 may comprise local media such as a hard disk, a CD-ROM, a DVD, portable flash memory, or other data storage device. In other cases, player the content source 414 may be remote, and the media player 410 may receive the player audio content 412 over a network such as the Internet. In some cases, the player audio content 412 may be streamed from the player content source 414 to the media player 410. That is, player audio content 412 may be provided as a continuous stream of data that is rendered as it is received by the media player 410.

In some cases, the player content source 414 may comprise a broadcast source, meaning that at any given time the same content is being provided to multiple different users and media players. Such a content source 414 may provide multiple channels or streams of audio or video, and the user may interact with the media player 410 to select which of the broadcast channels or streams is played at any given time. The player content source 414 may in some cases comprise a cable broadcast system or a terrestrial broadcast system, which may be decoded and/or demodulated with an appropriate decoder or OTA tuner.

Available player content sources 414 may also include various types of online storage services from which content items can be streamed or downloaded, including on-demand services that allow each user to independently select from multiple content items. Online storage services may include media sharing services, social networking services, media storage services, etc.

Generally, the player content source 414 represents any available type and combination of content sources, from which may be obtained an unlimited range of audio content items in an unlimited range of formats.

The control service 108, in particular the content matching component 312 of the control service 108, may implement a content identification component 416 configured to identify the player audio content 412. In the embodiment of FIG. 4, the content identification component 416 may communicate with the media player 410 and/or the overall system with which the media player 410 is associated in order to identify the player audio content 412. For example, the content identification component 416 may communicate with the media player 410 over a broad-area network such as the Internet using application programming interfaces (APIs) of the media player 410. As another example, the content identification component 416 may communicate with the media player 410 using local communication techniques and protocols such as Bluetooth®, a wired local-area network, a wireless-local area network, etc. The content identification component 416 may query the media player 410 regarding currently playing audio content 412, and the media player in response may provide an identification of the player audio content 412. For example, the media player 410 might respond by providing the title of a song, movie, or program being played by the media player 410. In some cases, the media player 410 may provide additional identifying information such as the author, artist, producer, publisher, etc. of the currently playing audio content. The media player 410 may also indicate the temporal point within the player audio content 412 that is currently being played. In some cases, the media player 410 may indicate the source of the player audio content 412, such as by indicating an Internet universal resource locator (URL) or other specifications that allow the player audio content 412 to be obtained.

In embodiments where the player content source 414 is an online streaming service, the content identification component 416 may communicate with the player content source 414 in order to identify the player audio content 412 For example, the content identification component 416 may be configured to query an online music service to determine which music a user is currently streaming on his or her media player 410 as well as the temporal point within the music that is currently being provided to the media player 410. The online music service may respond by indicating information such as the author, artist, producer, publisher, etc. of the currently playing audio content 412. The online music service may also provide a URL to the currently playing audio content or may provide other information regarding the currently playing audio content.

Upon identifying the player audio content 412, the system 100 identifies and/or obtains matching reference audio content 418 from a second content source 420, also referred to as a reference content source. The reference audio content 418 may the same as the player audio content 412, although the reference audio content 418 may in some cases be obtained from a different source than the player audio content 412.

The reference content source 420 may comprise any one or multiple ones of various content repositories that accessible by the system 100. Generally, the reference content source 420 may include the same types of sources as the player content source 414, and may include a substantial portion of audio content that is available to large numbers of users. In some cases the reference content source 420 may be the same as the player content source 414, or may comprise the same combination of sources.

A reference audio signal 422 representing the reference audio content 418 is provided to an interference cancellation component 424, which is similar in operation to an acoustic echo cancellation (AEC) component. The interference cancellation component 424 also receives the microphone audio signal 404. Generally, the interference cancellation component 424 removes or cancels the reference audio content 418 from the input audio signal 404, producing an interference-suppressed audio output signal 426. The interference-suppressed audio output signal 426 is provided to speech processing components 428 of the system 100, which perform ASR and NLU to recognize user speech and understand user intent.

Effectively, the interference cancellation component 424 produces the interference-suppressed audio output signal 426 by temporally aligning the reference audio signal 422 with the interfering sound 408 in the input audio signal 404 and then subtracting the aligned reference audio signal 422 from the input audio signal 404.

More specifically, the interference cancellation component 424 may comprise an adaptive finite impulse response (FIR) filter 430 and a subtraction component 432. The adaptive FIR filter 430 generates an estimated interference signal 434, which estimates one or more components of the input audio signal 404 that represent the interfering sound 408. The estimated interference signal 434 is subtracted from the input audio signal 404 by the subtraction component 432 to produce the interference-suppressed audio output signal 426.

The adaptive FIR filter 430 estimates interference components by generating and repeatedly updating a sequence of coefficients and by applying the coefficients respectively to a sequence of most recently received samples of the input audio signal 404. The adaptive FIR filter 430 calculates and dynamically updates the coefficients so as to continuously and adaptively minimize the signal power of the interference-suppressed audio output signal 426, which is referred to as the "error" signal in the context of adaptive filtering.

In addition to the processing illustrated in FIG. 4, various other audio processing techniques may be used to process the input audio signal 404 in accordance with various design objectives. For example, various types of noise suppression, beamforming, and other audio processing may be implemented either upstream or downstream of the interference cancellation component 424. Furthermore, although FIG. 4 illustrates a particular type of signal cancellation based on adaptive filtering, different signal cancellation techniques may also be used.

Figure 5:
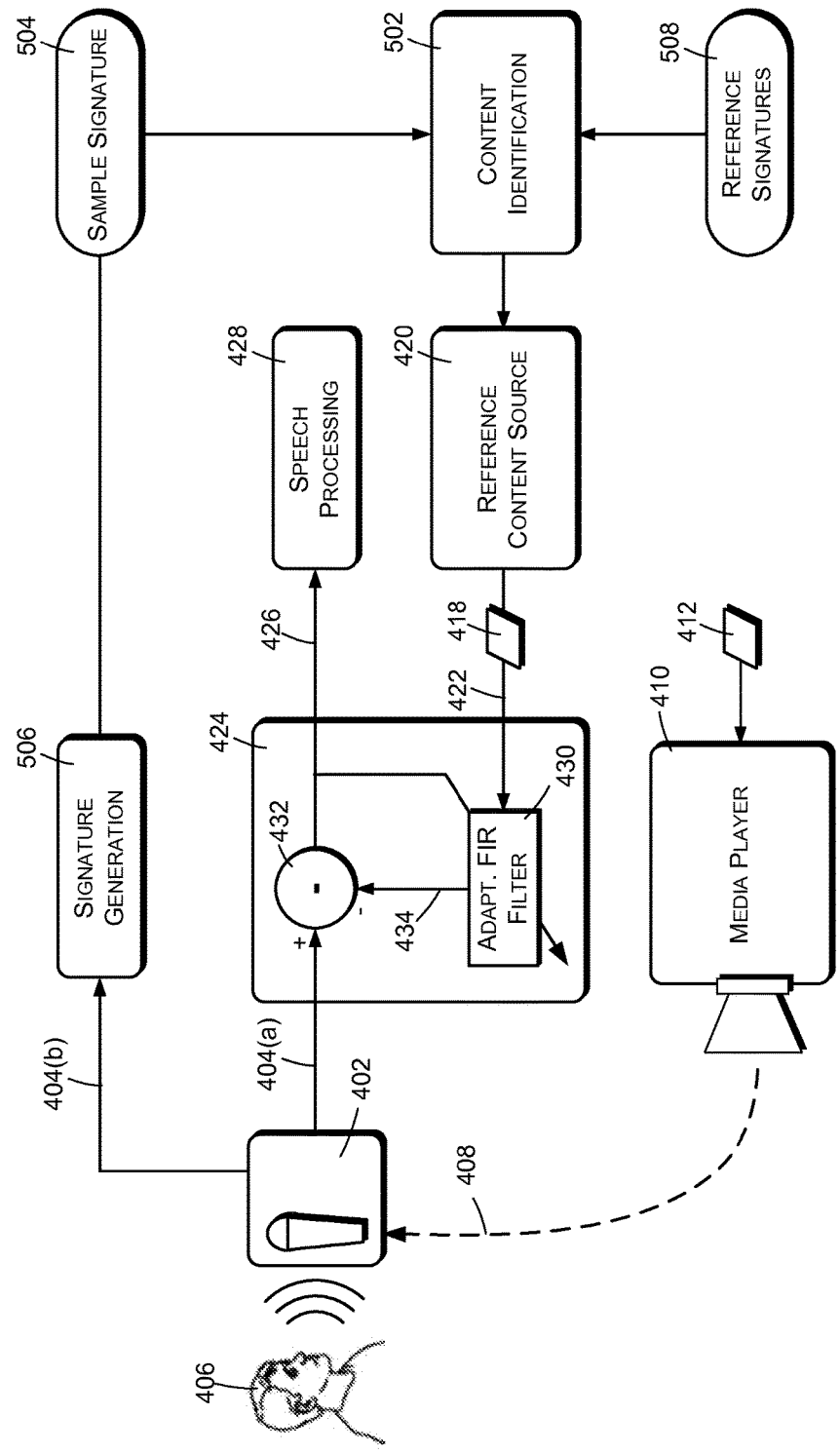

FIG. 5 shows an alternative example of logical operations and functionality that may be implemented in the system 100. The example of FIG. 5 is similar to the example of FIG. 4, and similar components are identified with the same reference numerals in FIG. 4. In some cases, the techniques of FIGS. 4 and 5 may be combined and used within a single device.

The audio input component 402 produces a first input audio signal 404(a) that contains speech or utterances of the user 406. The first input audio signal 404(a) also contains interfering sound 408 that has been played by a media player or system 410. The interfering sound may correspond to player audio content 412, which may be received from any source including remote sources or services as well as storage that is local or internal to the media player 410.

In some cases, the first input audio signal 404(a) may be a beam-focused audio signal provided by an audio beamforming component, and may emphasize user speech by selecting a directional signal corresponding to the direction of the user 406. In certain implementations, for example, one of multiple available directional audio signals may be chosen based on characteristics of the signals, such as determining which of the directional signals contains audio having characteristics of human speech or determining which of the available directional signals has the highest energy. Some implementations may also include a camera or other sensors, including infrared sensors, that may be used to determine the position or direction of the user 406. In these implementations, the first input audio signal 404(a) may be selected as the directional audio signal corresponding to the detected position of the user 406.

The control service 108, in particular the content matching component 312 of the control service 108, may implement a content identification component 502 configured to identify the player audio content 412. In the embodiment of FIG. 5, the content identification component 502 receives a sample signature 504, which has been generated by an audio signature generator or signature generation component 506. The signature generation component 506 generates the sample signature 504 by analyzing a second input audio signal 404(b) containing the interfering sound 408. The sample signature 504 functions as a fingerprint that uniquely identifies a content item and a particular temporal location within the content item.

In some embodiments, the second audio signal 404(b) may comprise or be the same as the first audio signal 404(a). In embodiments containing beamforming functionality, however, the first audio signal 404(a) may correspond to the direction of the user 406 while the second audio signal 404(b) may be a directional signal corresponding to a direction other than the direction of the user. Generally, in a system having beamforming capabilities, the first audio signal 404(a) is selected as the signal having the highest presence of user voice and the second audio signal 404(b) is selected as the signal have either the lowest presence of user voice or the highest presence of interfering audio. Thus, the first input audio signal 404(a) emphasizes user speech while the second input audio signal 404(b) does not emphasize user speech. In some cases, the second input audio signal may be selected to emphasize the interfering sound 408, by selecting a directional audio signal corresponding in direction to the position of the media player 410.

In order to identify the player audio content 412, the content identification component 502 compares the sample signature 504 to multiple reference signatures 508 that correspond respectively to multiple content items of the reference content source 420. The reference signatures 508 may be pre-computed by analyzing available repositories of audio content items. The reference signatures 508 may correspond to large numbers of available content items, which may include a substantial portion or percentage of audio content that is available to the user 406 and/or to all users of similar media devices.

Upon identifying the currently playing player audio content 412, the system 100 identifies and/or obtains the matching reference audio content 418 from the reference content source 420. The reference audio content 418 is the same as the player audio content 412, in that the reference audio content 418 is represented by a digital data stream that is the same or substantially the same as that of the player audio content. However, the reference audio content 418 may be obtained from a different content source than the player audio content 412.

Note that in the described embodiments the reference audio content 418 is obtained from sources other than the media player 410, although the reference source may at times comprise the same source as that from which the media player 410 obtains the player audio content 412.

The reference audio signal 422, representing the reference audio content 418, is provided to the interference cancellation component 424, which functions as described above to remove or cancel the reference audio content 418 from the first input audio signal 404(a), producing the interference-suppressed audio output signal 426. The interference-suppressed audio output signal 426 is provided to the speech processing components 428 of the system 100, which perform ASR and NLU to recognize user speech and understand user intent.

The source signature and reference signatures 508 may be generated in various ways. In certain embodiments, the signature generation component 506 may generate a signature or feature vector of an audio content item such as a song by analyzing the audio content to produce a spectrogram that represents frequency intensities of the content over time. For reference content items, such a spectrogram is calculated for the entire length of each content item. For player content, a spectrogram may be calculated for a sample or portion of the content. The spectrogram of the portion of the player content is then compared to the spectrograms of multiple reference content items to find a best match of the player spectrogram within the reference spectrograms.

In practice, each spectrogram may be analyzed and represented in an abbreviated form by identifying relevant points or features of the spectrogram and recording these features as a function of time. This procedure effectively reduces a spectrogram to a more sparse set of coordinates, referred to herein as a signature or fingerprint or feature vector, that can be more efficiently stored and compared. Because the features are recorded as a function of time, a set of spectrogram coordinates for an audio sample may be compared to a database of reference spectrograms to not only identify reference content corresponding to the audio sample but also to determine the location within the reference content to which the audio sample corresponds.

The recorded features may corresponding to defined characteristics of an audio waveform in accordance with various schemes. In one example, features may comprise energy changes or directions of energy changes within each frequency of multiple frequency bands over time. In another example, features may comprise intensity peaks that occur within each frequency band. Finding a matching reference signature for a given sample signature may use various types of noise correlation or fuzzy matching techniques. Features may be identified in either time or frequency domain representations of an input audio signal.

Figure 6:
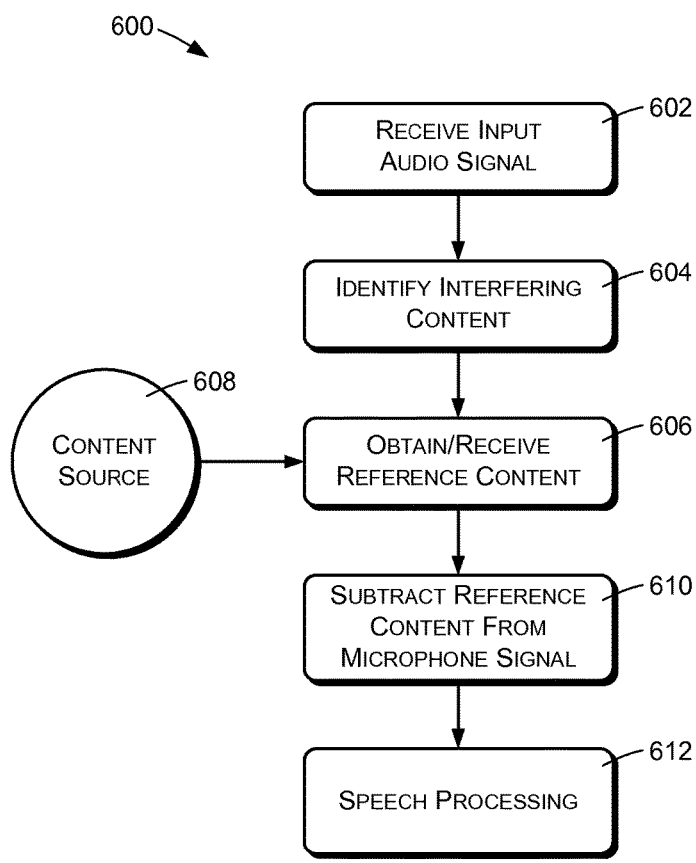
FIGS. 6 and 7 are flow diagrams illustrating example methods for suppressing interfering audio content from input audio signals.

FIG. 6 illustrates a method 600 such as may be performed by components of the system 100 described above, such as by the speech interface device 102 and the control service 108.

An action 602 comprises receiving one or more input audio signals from one or more microphones. The input audio signals may include user speech as well as interfering sound corresponding to content played by a media player.

An action 604 comprises identifying the content corresponding to the interfering sound. In some cases, the action 604 may be performed by querying a media player that is generating or playing the interfering sound. Similarly, the action 604 may in some cases be performed by querying a network-based media service that is providing the content to the media player. In other cases, the action 604 may be performed by analyzing an input audio signal as will be describe below with reference to FIGS. 7 and 8.

An action 606 comprises obtaining or receiving the identified content from a source 608 other than the media player, such as from one or more of the following, without limitation:
 a network broadcast signal;
 a terrestrial broadcast signal;
 a cable signal;
 a satellite broadcast signal;
 a network-accessible media storage service;
 a network-accessible media streaming service; or a user library.

The content source 608 may comprise the same source that is providing the content to the media player or may comprise a different source of the same or similar content.

An action 610 comprises processing at least one of the one or more input audio signals to subtract the identified and content from the input audio signal. This may be performed as described above using an adaptive filter and associated subtraction component.

An action 610 may comprise performing speech processing such as ASR and NLU to recognize speech in the one or more input audio signals and to understand a user intent from the recognized speech.

Figure 7:
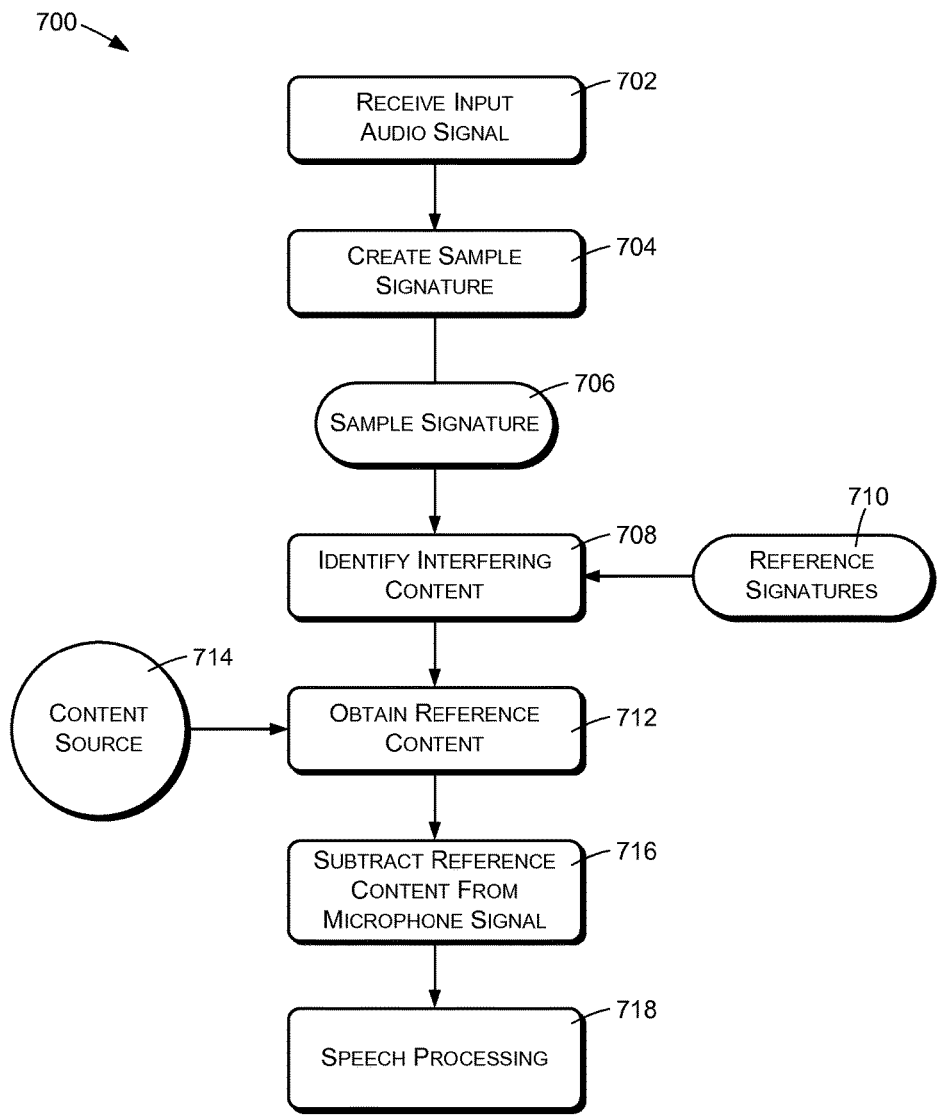

FIG. 7 illustrates another method 700 such as may be performed by components of the system 100 described above, such as by the speech interface device 102 and the control service 108.

An action 702 comprises receiving one or more input audio signals from one or more microphones. The one or more input audio signals may include user speech as well as interfering sound generated by a media player, corresponding to content played by the media player. In some cases, the one or more input audio signals may comprise a first audio signal that emphasizes user speech and a second audio signal that emphasizes the interfering sound.

An action 704 comprises creating a sample signature or fingerprint 706 of the interfering sound. The action 704 may be performed by analyzing one of the one or more input audio signals and by recording characteristics such as frequency/intensity characteristics of the input audio signal over a relatively short period of time such as several seconds.

An action 708 comprises identifying the content, referred to herein as interfering content, that corresponds to the interfering sound. This may comprise comparing the interfering sound with known content items. More specifically, the action 708 may comprise comparing the audio signature 706 with similarly created signatures or fingerprints 710 of known content items. Such comparing may be performed in order to find a signature of a known content item that matches the signature 706 of the interfering sound. In particular, the signature of a known content item is located such that the signature 706 of the interfering sound matches a portion of the signature of the known content item. The matching location within the known content item indicates the temporal point of playback of the interfering content by the media player.

The reference signatures 710 may be prepared and archived in a preparatory step and/or on an ongoing basis as new content items are created and made available. An archive of signatures 710 may include signatures corresponding to substantial percentages of content items that are available to large numbers of user populations. In some cases, however, the reference signatures against which the sample signature 706 is compared may be limited to a subset of the existing signatures 710. Such a subset may comprise signatures corresponding to content items that are currently available to the media player and/or to the user of the media player. For example, the subset may contain signatures for content items that the user owns. As another example, the subset may comprise signatures for content items that are currently being broadcast by network broadcast channels.

An action 712 comprises obtaining or receiving the identified known content from a source 714 other than the media player, such as from one or more of the following, without limitation:
 a terrestrial broadcast signal;
 a cable signal;
 a satellite broadcast signal;
 a network-accessible media storage service;
 a network-accessible media streaming service; or a user library.

The content source 714 may comprise the same source that is providing the content to the media player or may comprise a different source of the same or similar content.

An action 716 comprises processing the input audio signal to subtract the identified content from the input audio signal. This may be performed as described above using an adaptive filter and associated subtraction component.

An action 718 may comprise performing speech processing such as ASR and NLU to recognize speech in the input audio signal and to understand a user intent from the recognized speech.

The actions of FIGS. 6 and 7 may in some embodiments be performed with respect to multiple sources of interfering sound. In some cases, the actions of FIGS. 6 and 7 may utilize input audio signals corresponding to the different directions of the multiple interfering sound sources.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. A speech-based system, comprising:
one or more microphones configured to produce:
a first input audio signal containing user speech and an interfering sound from a media content item played by a media player, the media player and the user in proximity to the speech-based system and the user speech including at least one spoken command for the speech-based system; and
a second input audio signal containing the user speech and the interfering sound from the media content item played by the media player;
one or more processors;
non-transitory computer-readable storage media maintaining instructions executable by the one or more processors to perform operations comprising:
selecting the first input audio signal as a first directional audio signal corresponding to a direction of a source of the user speech;
selecting the second input audio signal as a second directional audio signal corresponding to a direction other than the direction of the source of the user speech based at least in part on a directional audio signal corresponding in direction to a known position of the media player;
analyzing the second input audio signal to determine at least one characteristic of content of the second input audio signal;
requesting an identity of a player content item being currently played by the media player and a temporal point within the player content item that is currently being output by the media player;
generating an audio signature representative of the interfering sound based at least in part on the at least one characteristic of the content of the second input audio signal;
identifying a plurality of media content items that are currently accessible to the media player;
selecting a particular media content item of the plurality of media content items based at least in part on the audio signature, the identity of the player content item, the temporal point, and a reference audio signature that corresponds to the particular media content item;
receiving at least a portion of the particular media content item that corresponds to the interfering sound from a reference content source; and
processing the first input audio signal to suppress the interfering sound based at least in part on the at least the portion of the particular media content item by subtracting the portion of the particular media content item from the first input audio in order to obtain an interference-suppressed speech; and
sending the interference-suppressed speech to a remote service for performing automatic speech recognition and natural language understanding on the interference-suppressed speech in order to determine an intent to perform or initiate functions or services expressed by the spoken command.

2. The speech-based system of claim 1, the operations further comprising:
causing an adaptive filter to produce an interference signal that estimates the interfering sound in the first input audio signal based at least in part on the media content item; and
subtracting the interference signal from the first input audio signal to produce the interference-suppressed audio signal.

3. The speech-based system of claim 1, further comprising a sensor configured to detect the direction of the source of the user speech.

4. The system of claim 1, wherein the audio signature is a spectrogram that represents frequency intensities of the content of the second audio signal over time.

5. The system of claim 1, wherein the audio signature is a spectrogram calculated over a portion of the content of the second audio signal.

6. The system of claim 5, further comprising identifying the particular media content item by determining a first portion of the spectrogram of the audio signature that corresponds to a second portion of a reference spectrogram of the particular media content item.

7. The system of claim 1, wherein the audio signature is a feature vector.

8. The system of claim 1, wherein the audio signature includes one or more features representing direction of energy changes within frequency bands of the content of the second audio input over time.

9. A method being performed at a speech interface device in communication with a media player and a reference content source, the method comprising:
receiving an input audio signal from a user in proximity of the speech interface device, wherein the input audio signal comprises a first input audio signal and a second input audio signal, the first input audio signal having a higher presence of user speech than the second input audio signal and the second input audio signal having a higher presence of interfering sound produced by a media player outputting audible audio sound in proximity to the speech interface device than the first input audio signal, the user speech including spoken commands to the speech interface;
selecting the first input audio signal as a first directional audio signal corresponding to a direction of a source of the user speech;
selecting, based in part on a directional audio signal corresponding in direction to a known position of the media player, the second input audio signal as a second directional audio signal corresponding to a direction other than the direction of the source of the user speech;

analyzing the second input audio signal to identify at least one characteristic of content of the second input audio signal;

requesting, by the speech interface device form the media player, an identity of a player content item being currently played by the media player and a temporal point within the player content item that is currently being output by the media player;

determining, based at least in part on the at least one characteristic of the content of the second input audio signal, the identity of the player content item, and the temporal point, an identified media content item that includes sound corresponding to the interfering sound;

obtaining a matching media content item from the reference content source, wherein the matching media content item matches the identified media content item that includes the sound corresponding to the interfering sound;

processing the first input audio signal to suppress the identified media content item identified as the interfering sound in the first input audio signal by subtracting the matching media content item from the input audio in order to obtain an interference-suppressed speech; and sending the interference-suppressed speech to a remote service for performing automatic speech recognition and natural language understanding on the interference-suppressed speech in order to determine an intent to perform or initiate functions or services expressed by the spoken command.

10. The method of claim 9, wherein processing the first input audio signal comprises removing a portion of the first input audio signal corresponding to the at least the portion of the media content item from the first input audio signal.

11. The method of claim 9, further comprising:
identifying an audio signature of the interfering sound; and
comparing the audio signature to a reference audio signature of the media content item.

12. The method of claim 9, further comprising:
identifying a plurality of media content items that includes the media content item that are one or more of (a) currently accessible to the media player or (b) currently available to a user; and
comparing the interfering sound from the second input audio signal with sound associated with the plurality of media content items.

13. The method of claim 9, further comprising:
receiving, from the media player, an indication of a source of the interfering sound; and
selecting the reference content source based at least in part on the indication of the source of the interfering sound.

14. The method of claim 9, further comprising:
determining a starting point and an ending point of the media content item that corresponds to the interfering sound; and
wherein the at least the portion of the media content item received from the reference content source corresponds to sound data associated with content between the starting point and the ending point.

15. The method of claim 9, wherein the at least the portion of the media content item comprises the temporal location within the media content item.

16. A system comprising:
one or more microphones;
one or more processors of a first electronic device; and
non-transitory computer-readable media maintaining instructions executable by the one or more processors of the first electronic device to perform acts comprising:

receiving a first input audio signal from the one or more microphones;

receiving a second input audio signal from the one or more microphones;

determining a direction of a source of user speech;

determining that the first input audio signal is associated with the direction of the source of the user speech, the user speech inducing a command for the system spoken by a user in proximity to the system;

determining, based in part on a direction associated with a known position of a media player, that the second input audio signal is associated with a direction other than the direction of the source of the user speech, the second input audio signal having a higher presence of interfering sound produced by a media player outputting audible audio sound in proximity to the system than the first input audio signal;

selecting the first input audio signal as a first directional audio signal corresponding to a direction of a source of the user speech;

identifying, based at least in part on an analysis of the second input audio signal at least one characteristic of content of the second input audio signal;

requesting an identity of a player content item being currently played by the media player and a temporal point within the player content item that is currently being output by the media player;

identifying a media content item associated with an interfering sound in the second input audio signal that was produced by a second electronic device based at least in part on the at least one characteristic of content of the second input audio signal, the identity of the player content item, and the temporal point;

determining at least a portion of the media content item that corresponds to the interfering sound;

receiving, from a reference content source, the at least the portion of the media content item; and processing the first input audio signal by removing the at least the portion of the media content item from the first input audio signal by subtracting the portion of the media content item from the first input audio in order to obtain interference-suppressed speech; and sending the interference-suppressed speech to the control service for performing automatic speech recognition and natural language understanding on the interference-suppressed speech in order to determine an intent to perform or initiate functions or services expressed by the command.

17. The system of claim 16, the acts further comprising:
identifying an audio signature of the interfering sound; and
wherein determining the at least the portion of the media content item that corresponds to the interfering sound comprises comparing the audio signature of the interfering sound with a reference audio signature associated with the media content item.

18. The system of claim 16, wherein the first input audio signal comprises a plurality of directional audio signals and the determining the direction of the source of the user speech comprises determining a one of the plurality of directional audio signals having a highest presence of user voice.

19. The system of claim 16, wherein the removing the at least the portion of the media content item comprises generating an estimated interference signal by an adaptive finite impulse response (FIR) filter and subtracting the estimated interference signal from the first input audio signal.

* * * * *